US010026986B2

(12) United States Patent
Nishiyama et al.

(10) Patent No.: US 10,026,986 B2
(45) Date of Patent: Jul. 17, 2018

(54) FUEL CELL STACK (71) Applicant: HONDA MOTOR CO., LTD., Tokyo (JP)

(72) Inventors: Tadashi Nishiyama, Wako (JP); Yusuke Nara, Wako (JP); Kosuke Takagi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 227 days.

(21) Appl. No.: 15/011,663

(22) Filed: Feb. 1, 2016

(65) Prior Publication Data
US 2016/0226092 A1 Aug. 4, 2016

(30) Foreign Application Priority Data

Feb. 2, 2015 (JP) .................. 2015-018100

(51) Int. Cl.
H01M 8/24 (2016.01)
H01M 8/2475 (2016.01)
H01M 8/241 (2016.01)
H01M 2/00 (2006.01)
H01M 8/00 (2016.01)

(52) U.S. Cl.
CPC ......... *H01M 8/2475* (2013.01); *H01M 8/241* (2013.01); *H01M 2250/20* (2013.01); *Y02T 90/32* (2013.01)

(58) Field of Classification Search
CPC ...... H01M 8/241; H01M 8/2475; H01M 8/00; H01M 2/00; H01M 8/24; H01M 8/248; H01M 8/2465; H01M 8/0221; H01M 8/0206; H01M 2/0247
See application file for complete search history.

(56) References Cited

U.S. PATENT DOCUMENTS

2008/0305368 A1* 12/2008 Takahashi ........... H01M 8/2475
429/437

FOREIGN PATENT DOCUMENTS

JP 2008-027761 2/2008

* cited by examiner

Primary Examiner — Karie O'Neill Apicella
(74) Attorney, Agent, or Firm — Mori & Ward, LLP (57) ABSTRACT A fuel cell stack includes unit cells, a resin load receiver, and a connecting member. The resin load receiver is provided in each of a first and second separators. The resin load receiver has a projecting portion that projects outwardly from an outer peripheral edge of each of the first and second separators and that has a projecting portion lateral face. The connecting member includes an engagement portion engaged with the resin load receiver and having a depressed portion into which the projecting portion is inserted and which has a depressed portion lateral face facing the projecting portion lateral face. A distance between the projecting portion lateral face and the depressed portion lateral face at a root portion of the projecting portion is smaller than a distance between the projecting portion lateral face and the depressed portion lateral face at an end of the projecting portion.

20 Claims, 8 Drawing Sheets

FUEL CELL STACK

CROSS-REFERENCE TO RELATED APPLICATIONS

The present application claims priority under 35 U.S.C. $ 119 to Japanese Patent Application No. 2015-018100, filed Feb. 2, 2015, entitled "Fuel Cell Stack." The contents of this application are incorporated herein by reference in their entirety.

BACKGROUND

1. Field

The present disclosure relates to a fuel cell stack.

2. Description of the Related Art

In general, a solid polymer electrolyte fuel cell uses a solid polymer electrolyte membrane composed of a polymer ion exchange membrane. The fuel cell includes a membrane electrode assembly (MEA) in which one side of a solid polymer electrolyte membrane is provided with an anode electrode and the other side of the solid polymer electrolyte membrane is provided with a cathode electrode. The MEA is interposed between separators (bipolar plates), thereby forming a fuel cell. A predetermined number of fuel cells is stacked, and the stacked fuel cells are thereby mounted on a fuel cell electric vehicle, for instance, as an in-vehicle fuel cell stack.

Normally, the fuel cell stack is provided with a fastening member that applies a clamping load to the unit cells inclusively between the unit cell located at one end of the fuel cell stack in the stacking direction and the unit cell located at the other end in the stacking direction in order to protect the unit cells from falling apart.

In particular, an impact load may be applied to the in-vehicle fuel cell stack from the outside. In that case, movement of the unit cells in the stacking direction of the unit cells is not likely to occur because the clamping load is applied to the fastening member in the stacking direction. On the other hand, movement of the unit cells in a direction (a height direction or a horizontal direction) perpendicular to the stacking direction is likely to occur because the clamping load is not applied to the unit cells in the perpendicular direction.

Thus, in order to reduce such movement, a load receiver may be provided in the outer peripheral edge of the separators to absorb the impact load by the load receiver. For instance, in Japanese Unexamined Patent Application Publication No. 2008-27761, the present assignee proposes a structure in which a fuel cell stack is housed in a casing and a load receiver provided in a predetermined separator is made protruding so as to come into contact with the inner wall of the casing.

SUMMARY

According to one aspect of the present invention, a fuel cell stack includes a plurality of unit cells, a resin load receiver, and a connecting member. The plurality of unit cells is stacked. Each of the unit cells is formed by sandwiching a membrane electrode assembly between a pair of separators. The membrane electrode assembly is formed by interposing an electrolyte between an anode electrode and a cathode electrode. The resin load receiver is provided in the separators and receives a load in a direction perpendicular to a stacking direction of the unit cells. The connecting member extends in the stacking direction of the unit cells and supports the unit cells. The connecting member includes an engagement portion to be engaged with the load receiver. The load receiver has a projecting portion that projects outwardly from an outer peripheral edge of the separators. The engagement portion has a depressed portion in which the projecting portion is inserted. A space between a lateral face of the projecting portion and a lateral face included in the depressed portion is set to be smaller in dimension at a root portion of the projecting portion than at an end of the projecting portion.

According to another aspect of the present invention, a fuel cell stack includes a plurality of unit cells, a resin load receiver, and a connecting member. The plurality of unit cells is stacked. Each of the unit cells is formed by sandwiching a membrane electrode assembly between a pair of separators. The membrane electrode assembly is formed by interposing an electrolyte between an anode electrode and a cathode electrode. The resin load receiver is provided in the separators and receives a load in a direction perpendicular to a stacking direction of the unit cells. The connecting member extends in the stacking direction of the unit cells and supports the unit cells. The connecting member includes an engagement portion to be engaged with the load receiver. The load receiver has a depressed portion that is internally depressed from the outer peripheral edge of the separators. The engagement portion has a projecting portion to be inserted in the depressed portion. A space between a lateral face included in the depressed portion and a lateral face of the projecting portion is set to be smaller in dimension on an inner side of the depressed portion in a depth direction than on an outer side of the depressed portion in the depth direction.

According to further aspect of the present invention, a fuel cell stack includes unit cells, a resin load receiver, and a connecting member. The unit cells are stacked in a stacking direction. Each of the unit cells includes a membrane electrode assembly, a first separator, and a second separator. The membrane electrode assembly includes an electrolyte, an anode electrode, and a cathode electrode. The electrolyte is interposed between the anode electrode and the cathode electrode in the stacking direction. The membrane electrode assembly is sandwiched between the first separator and the second separator in the stacking direction. The resin load receiver is provided in each of the first and second separators so as to receive a load in a direction perpendicular to the stacking direction. The resin load receiver has a projecting portion that projects outwardly from an outer peripheral edge of each of the first and second separators and that has a projecting portion lateral face. The connecting member supports the unit cells and includes an engagement portion engaged with the resin load receiver and having a depressed portion into which the projecting portion is inserted and which has a depressed portion lateral face facing the projecting portion lateral face. A distance between the projecting portion lateral face and the depressed portion lateral face at a root portion of the projecting portion is smaller than a distance between the projecting portion lateral face and the depressed portion lateral face at an end of the projecting portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
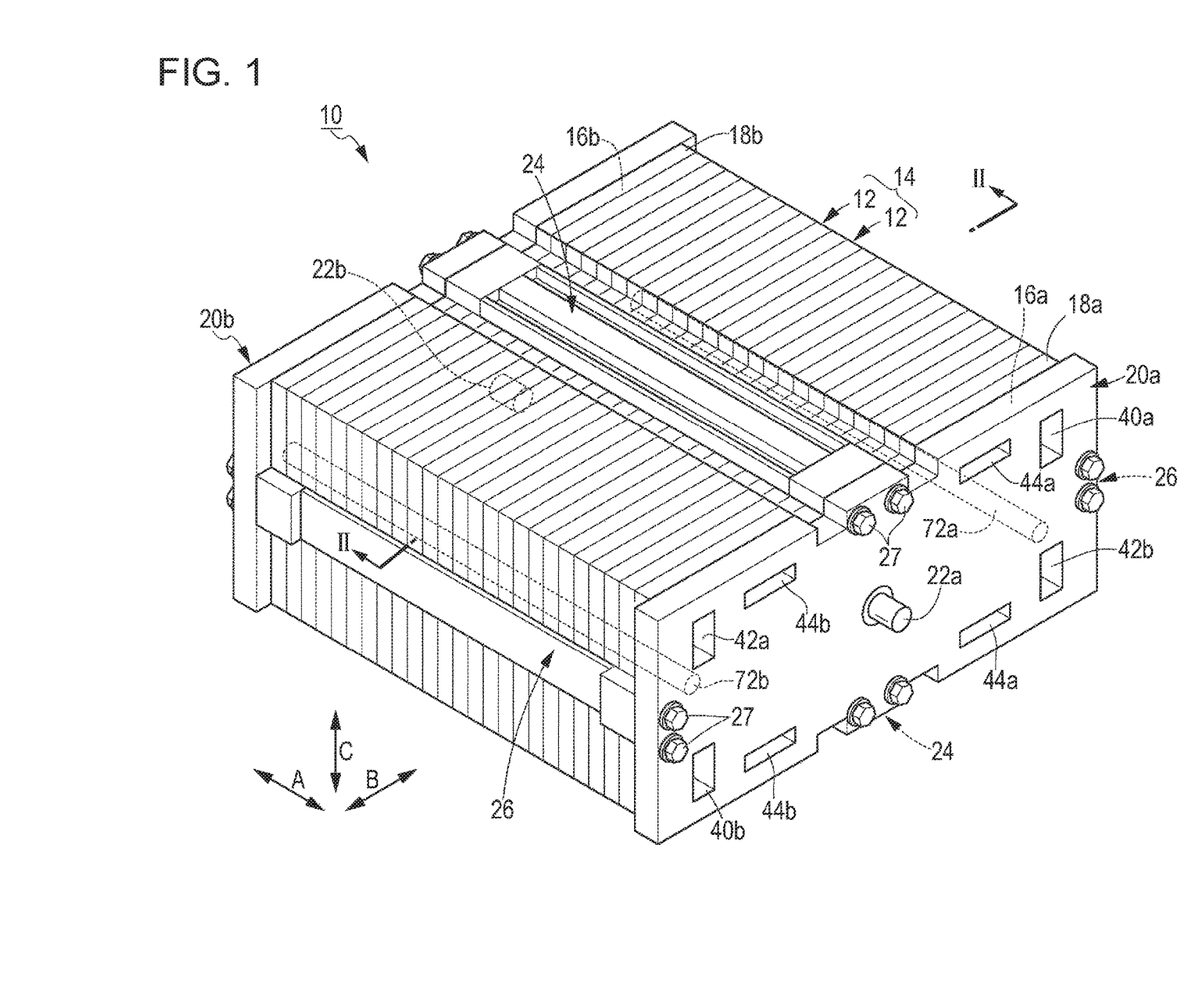
FIG. 1 is a schematic overall perspective view of a fuel cell stack according to a first embodiment of the present disclosure.

As illustrated in FIG. 1, a fuel cell stack 10 according to a first embodiment of the present disclosure has a stacked body 14 in which a plurality of unit cells 12 (fuel cells) is stacked in a horizontal direction (in the direction of arrow A) in a standing posture. The fuel cell stack 10 forms, for instance, and in-vehicle fuel cell stack and is mounted on a fuel cell vehicle (fuel cell electric vehicle) which is not illustrated.

On end of the stacked body 14 in the stacking direction is provided with a first terminal plate 16a, a first insulating plate 18a, and a first end plate 20a in that order from the inner to the outer side. Similarly, the other end of the stacked body 14 in the stacking direction is provided with a second terminal plate 16b, a second insulating plate 18b, and a second end plate 20b in that order from the inner to the outer side.

A first output terminal 22a connected to the first terminal plate 16a extends from a central portion of the first end plate 20a. A second output terminal 22b connected to the second terminal plate 16b extends from a central portion of the second end plate 20b.

Figure 2:
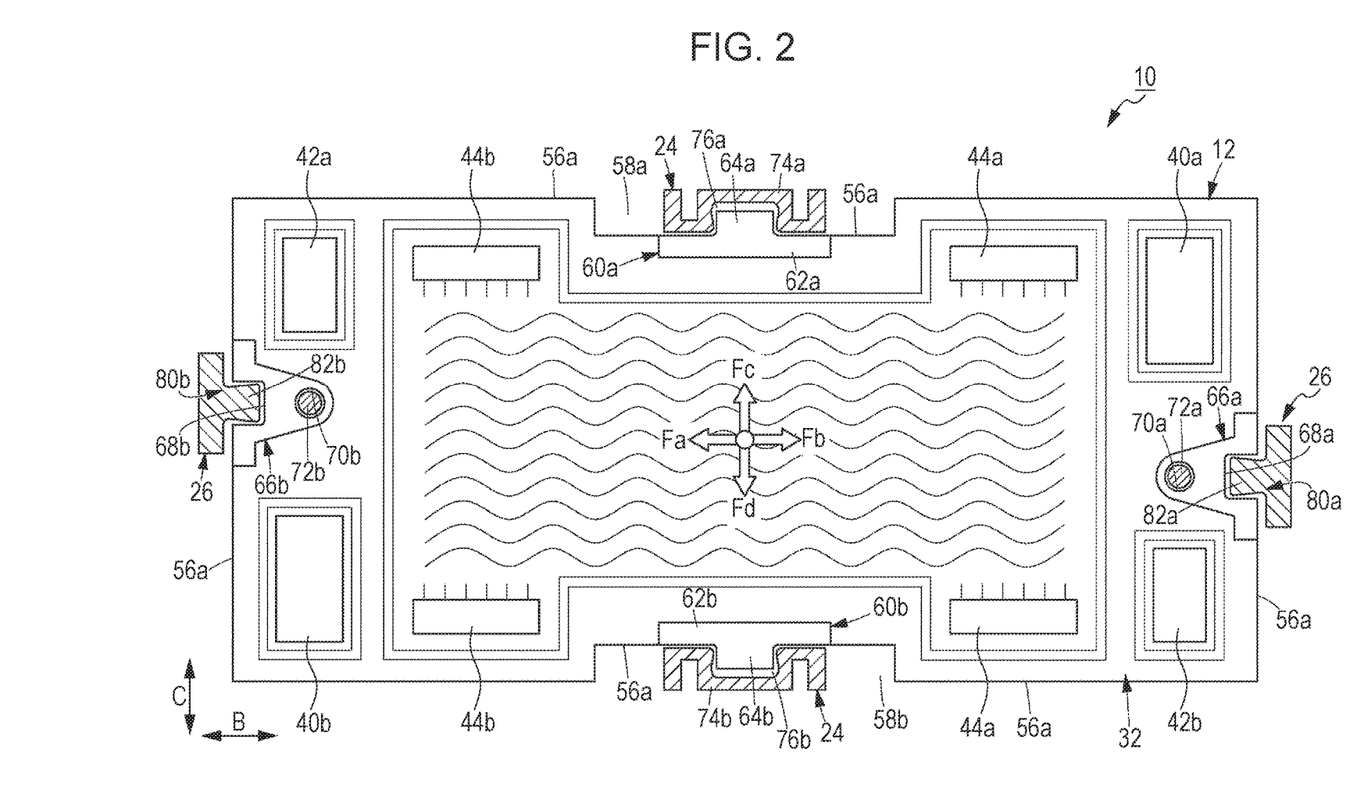
FIG. 2 is a sectional view of the fuel cell stack taken along line II-II of FIG. 1.

The first end plate 20a and the second end plate 20b are horizontally long rectangles, and between the respective longer sides thereof, first connecting members 24 are disposed in the outward direction of the stacked body 14 (see FIG. 1 and FIG. 2). Second connecting members 26 are disposed between the respective shorter sides of the first end plate 20a and the second end plate 20b in the outward direction of the stacked body 14. The first connecting members 24 and the second connecting members 26 are each secured to the first end plate 20a and the second end plate 20b via screws 27 (see FIG. 1).

Figure 3:
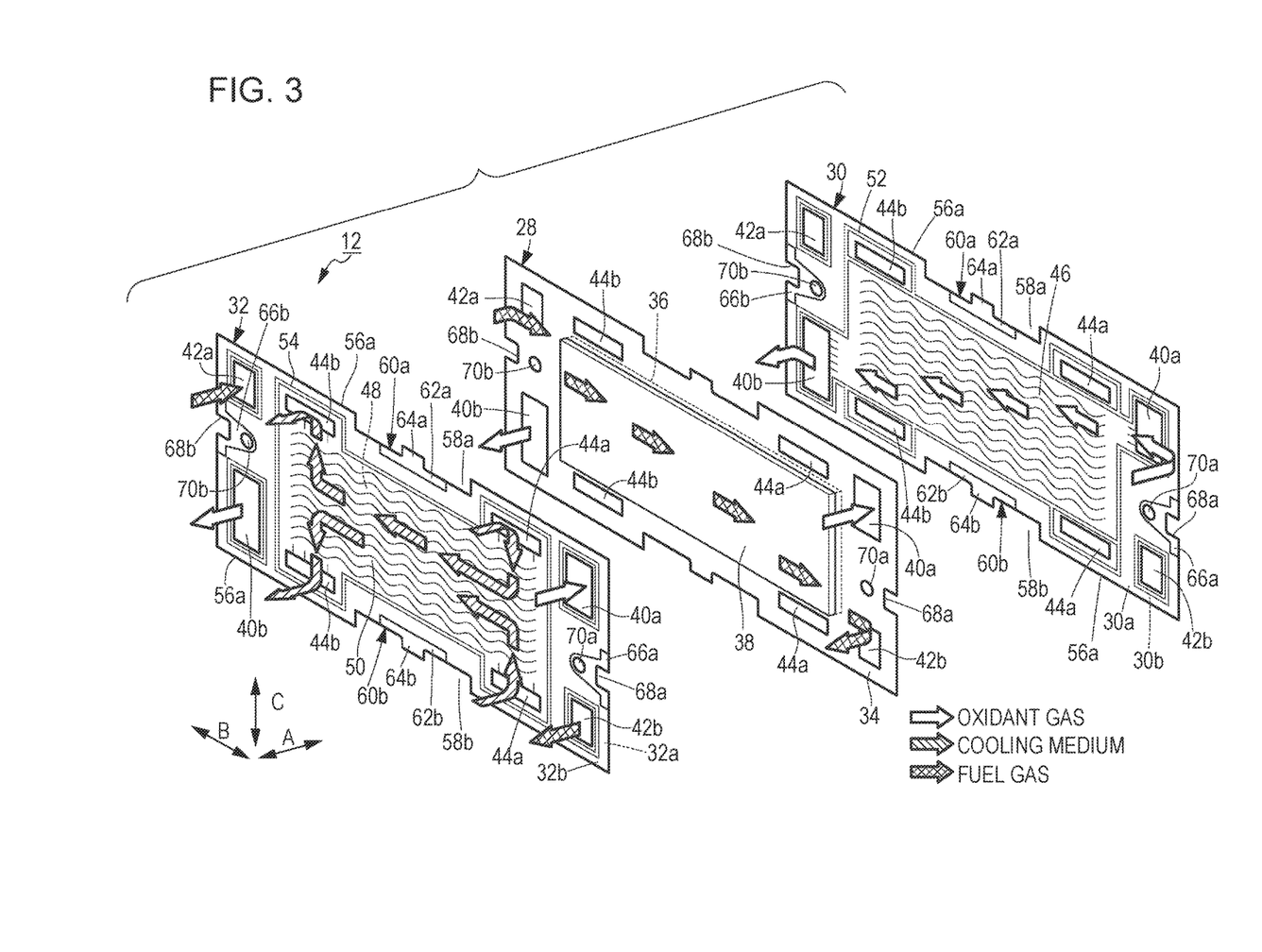
FIG. 3 is an exploded perspective view of a principal part of a unit cell included in the fuel cell stack.

As illustrated in FIG. 3, unit cells 12, which are constituents of the stacked body 14, each include MEA 28 and a first separator 30 and a second separator 32 that sandwich the MEA 28.

The MEA 28 includes, for instance, a solid polymer electrolyte membrane (positive ion exchange membrane) 34 in which a thin perfluorosulfonic acid membrane is impregnated with water, and a cathode electrode 36 and an anode electrode 38 that sandwich the solid polymer electrolyte membrane 34. Each of the unit cells 12 is a solid polymer electrolyte fuel cell.

The cathode electrode 36 and the anode electrode 38 each have a gas diffusion layer (not illustrated) including carbon paper, and an electrode catalyst layer (not illustrated) that is formed by uniformly applying porous carbon particles, on the surfaces of which platinum alloy is supported, to the surface of the gas diffusion layer. The electrode catalyst layer is formed on both sides of the solid polymer electrolyte membrane 34.

The first separator 30 and the second separator 32 are each formed of, for instance, a steel plate, a stainless steel plate, an aluminum plate, a plated steel plate, or a metal plate whose surface has undergone surface treatment for corrosion protection. It is to be noted that instead of a metal separator, for instance, a carbon separator may be used for the first separator 30 and the second separator 32.

As illustrated in FIG. 3, one end edge of the unit cell 12 in the longitudinal direction (the direction of arrow B) is provided with an oxidant gas supply manifold 40a and a fuel gas discharge manifold 42b above and below, which each communicate in the direction of arrow A. The oxidant gas supply manifold 40a supplies an oxidant gas, for instance, an oxygen containing gas, whereas the fuel gas discharge manifold 42b discharges a fuel gas, for instance, a hydrogen containing gas.

The other end edge of the unit cell 12 in the longitudinal direction is provided with a fuel gas supply manifold 42a for supplying a fuel gas and an oxidant gas discharge manifold 40b for discharging an oxidant gas which each communicate in the direction of arrow A.

One side of both end edges of the unit cell 12 in the transverse direction (the direction of arrow C), that is, the side near the oxidant gas supply manifold 40a and the fuel gas discharge manifold 42b is provided with two cooling medium supply manifolds 44a above and below, which each communicate in the direction of arrow A. The cooling medium supply manifolds 44a each supply a cooling medium, and are provided on opposite sides.

The other side of both end edges of the unit cell 12 in the transverse direction, that is, the side near the fuel gas supply manifold 42a and the oxidant gas discharge manifold 40b is provided with two cooling medium discharge manifolds 44b above and below, which each communicate in the direction of arrow A. The cooling medium discharge manifolds 44b each discharges a cooling medium, and are provided on opposite sides.

An oxidant gas passage 46, which communicates with the oxidant gas supply manifold 40a and the oxidant gas discharge manifold 40b, is formed on surface 30a of the first separator 30, the surface 30a facing the MEA 28. The oxidant gas passage 46 is formed of a plurality of waveform passage grooves (or linear passage grooves) that extends in the direction of arrow B.

A fuel gas passage 48, which communicates with the fuel gas supply manifold 42a and the fuel gas discharge manifold 42b, is formed on surface 32a of the second separator 32, the surface 32a facing the MEA 28. The fuel gas passage 48 is formed of a plurality of waveform passage grooves (or linear passage grooves) that extends in the direction of arrow B.

A cooling medium passage 50, which communicates with the cooling medium supply manifolds 44a, 44a and the cooling medium discharge manifolds 44b, 44b, is formed between the surface 32b of the second separator 32 and the surface 30b of the first separator 30. The cooling medium passage 50 allows a cooling medium to flow over the range of the electrodes of the MEA 28.

A first seal member 52, which surrounds the outer peripheral edge of the first separator 30, is molded integrally with the surfaces 30a, 30b of the first separator 30. A second seal member 54, which surrounds the outer peripheral edge of the second separator 32, is molded integrally with the surfaces 32a, 32b of the second separator 32.

As the material for the first seal member 52 and the second seal member 54, a sealing material, a cushioning material, or a packing material, such as EPDM, NBR, a fluoride rubber, a silicone rubber, a fluoro silicone rubber, a butyl rubber, a natural rubber, a styrene rubber, a chloroprene or acrylic rubber is used.

In the unit cell 12, internally cut notches 58a, 58b are respectively formed in the centers of the longitudinal sides (the upper end and the lower end in FIG. 3) of outer peripheral edge 56a of the first separator 30 and the second separator 32. Approximately the central portions of the notches 58a, 58b are provided with first load receivers 60a, 60b integrally with or separately from the first separator 30 and the second separator 32.

As illustrated in FIG. 2 and FIG. 3, the first load receivers 60a, 60b are formed of a resin material, for instance. The first load receivers 60a, 60b integrally have bases 62a, 62b that are integrally formed with the first separator 30 and the second separator 32, and projecting portions 64a, 64b that project outwardly from the bases 62a, 62b. The bases 62a, 62b are disposed flush with the outer peripheral edge 56a.

Figure 4:
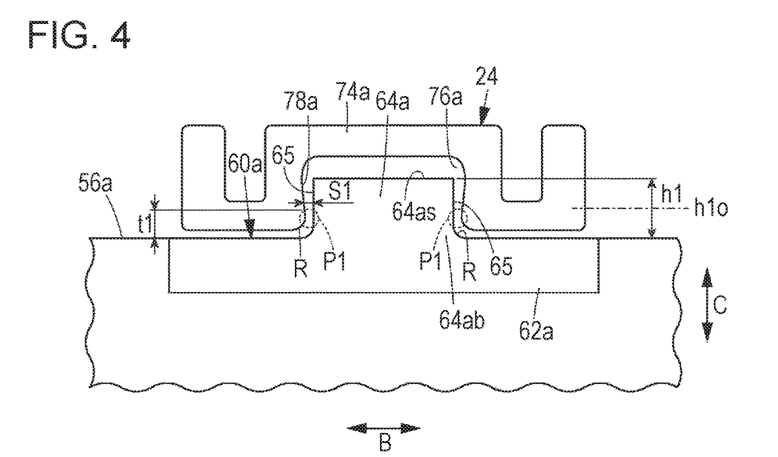
FIG. 4 is an enlarged front view of a principal part illustrating a first connecting member and a first load receiver.

The projecting portion 64a has a rectangular shape (square or rectangle) and as illustrated in FIG. 4, both lateral faces 65, 65 extend outwardly in parallel to each other and perpendicularly to the base 62a. The projecting portion 64b is formed similarly to the above-described projecting portion 64a.

It is to be noted that the first load receivers 60a, 60b are formed of a metal plate which is integral with the first separator 30 and the second separator 32, and insulating may be performed on the surface of the metal plate. In addition, the first load receivers 60a, 60b may be provided in symmetrical positions diagonally across the longitudinal sides of the first separator 30 and the second separator 32.

The first load receivers 60a, 60b are arranged in the stacking direction, and as described later, the first load receivers 60a together and the first load receivers 60b together are integrally engaged with (inserted in) depressed portions 76a, 76b, respectively, of the first connecting members 24.

The transverse sides (the right end and the left end in FIG. 3) of the outer peripheral edge 56a of the first separator 30 and the second separator 32 are integrally or separately provided with second load receivers 66a, 66b at different (or the same) positions in height. The second load receivers 66a, 66b are formed of a resin material, for instance, and are formed integrally with the first separator 30 and the second separator 32.

The second load receivers 66a, 66b have depressed portions 68a, 68b internally depressed from the outer peripheral edge 56a, and are provided with positioning holes 70a, 70b. Positioning pins 72a, 72b are inserted in the positioning holes 70a, 70b with space provided.

As illustrated in FIG. 2, the second load receivers 66a, 66b are formed of a resin material similarly to the first load receivers 60a, 60b. The second load receivers 66a together and the second load receivers 66b together are arranged in the stacking direction, and as described later, projecting portions 82a, 82b of the second connecting members 26 are integrally engaged with (inserted in) the respective second load receivers 66a, 66b.

The first connecting members 24 are each formed of a plate-shaped member that is formed by extrusion molding. Each first connecting member 24 has a curved bent shape in section, and engagement portions 74a, 74b, which are engaged with the projecting portions 64a, 64b of the first load receivers 60a, 60b of the unit cell 12, are provided extending in the stacking direction. The engagement portions 74a, 74b have the depressed portions 76a, 76b in which the projecting portions 64a, 64b are inserted.

As illustrated in FIG. 4, space (a distance) S1 between the lateral face 65 of the projecting portion 64a and lateral face 78a of the depressed portion 76a is set to be smaller in dimension at root portion 64ab of the projecting portion 64a than at end portion 64as of the projecting portion 64a. R-shaped portion, which is in point contact with the first load receiving unit 60a, is formed at an open lateral end of the lateral face 78a, whereas R-shaped portion is also formed at the root portion 64ab of the projecting portion 64a.

In the first embodiment, the lateral face 78a of the depressed portion 76a has a tapered shape which is inclined outwardly from the root portion 64ab of the projecting portion 64a to the end portion 64as. It is to be noted that depressed portion 76b is formed similarly to the depressed portion 76a and detailed description is omitted.

When a first load receiver 60a is displaced by an external load, contact point P1 between the engagement portion 74a and the first load receiver 60a is closer to the root portion 64ab than center h1o at midway of distance h1 from the root portion 64ab (the outer peripheral edge 56a) of the first load receiver 60a to the end portion 64as. More preferably, the contact point P1 is located within the range of control dimension for damage prevention t1 of the first load receiver 60a.

As illustrated in FIG. 2, the second connecting members 26 are each formed of a plate-shaped member that is formed by extrusion molding. Each second connecting member 26 has a curved bent shape in section, and engagement portions 80a, 80b, which are engaged with the depressed portions 68a, 68b of the second load receivers 66a, 66b of the unit cell 12, are provided extending in the stacking direction. The engagement portions 80a, 80b have the projecting portions 82a, 82b which are inserted in the depressed portions 68a, 68b.

Figure 5:
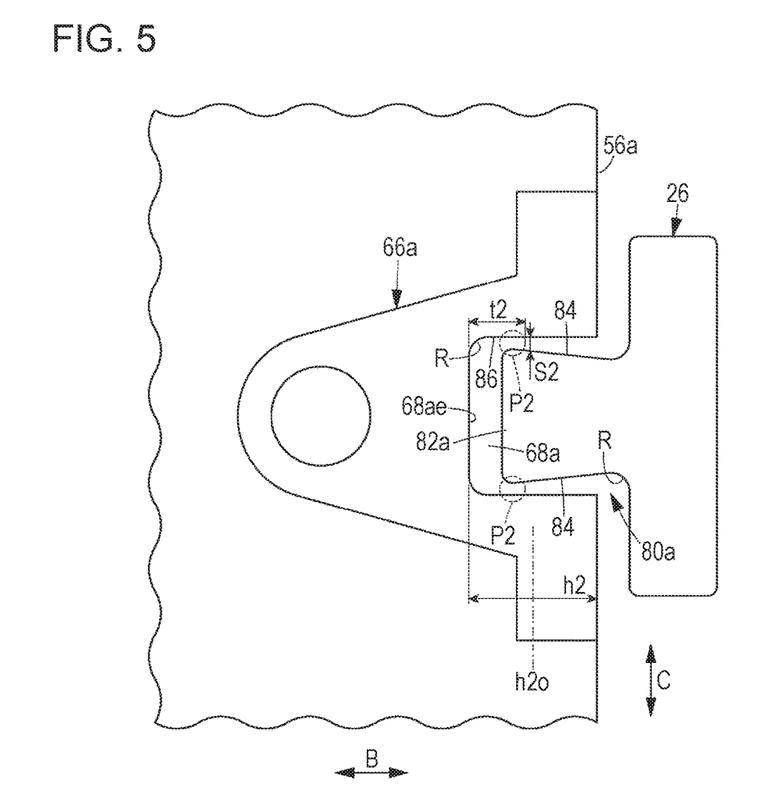
FIG. 5 is an enlarged front view of a principal part illustrating a second connecting member and a second load receiver.

As illustrated in FIG. 5, the projecting portion 82a forms tapered surfaces in which both lateral faces 84, 84 are inclined outwardly toward the end. Space (a distance) S2 between each lateral face 84 of the projecting portion 82a and a corresponding lateral face 86 of the depressed portion 68a is set to be smaller in dimension at the inner side of the depressed portion 68a in the depth direction than at the outer side of the depressed portion 68a in the depth direction. R-shaped portion is formed at each of the inner side of the depressed portion 68a in the depth direction and the root portion of the projecting portion 82a.

In the first embodiment, the lateral face 84 of the projecting portion 82a has a tapered shape which is inclined inwardly from the inner side of the depressed portion 68a in the depth direction to the outer side in the depth direction. It is to be noted that projecting portion 82b is formed similarly to the projecting portion 82a and detailed description is omitted.

When a second load receiver 66a is displaced by an external load, contact point P2 between the engagement portion 80a and the second load receiver 66a is closer to the bottom face 68ae than center h2o at midway of distance h2 from the outer peripheral edge 56a of the second load receiver 66a to bottom face 68ae of the depressed portion 68a. More preferably, the contact point P2 is located within the range of control dimension for damage prevention t2 of the second load receiver 66a.

As illustrated in FIG. 2, when the first load receivers 60a, 60b on the longitudinal sides are displaced, the outer peripheral edge 56a and the second connecting member 26 on one of the transverse sides come into surface contact with each other. Similarly, when the second load receivers 66a, 66b on the transverse sides are displaced, the outer peripheral edge 56a and the first connecting member 24 on one of the longitudinal sides come into surface contact with each other.

As illustrated in FIG. 1, all fluid manifolds are formed in the first end plate 20a. The all fluid manifolds are as follows: the oxidant gas supply manifold 40a, the fuel gas supply manifold 42a, the oxidant gas discharge manifold 40b, the fuel gas discharge manifold 42b, the cooling medium supply manifolds 44a, and the cooling medium discharge manifolds 44b. These fluid manifolds are connected to a manifold member which is not illustrated. It is to be noted that desired fluid manifolds may be selected and formed in the first end plate 20a and the second end plate 20b.

The operation of the fuel cell stack 10 configured in this manner will be described in the following.

First, as illustrated in FIG. 1, an oxidant gas such as oxygen containing gas is supplied to the oxidant gas supply manifold 40a of the first end plate 20a, whereas a fuel gas such as a hydrogen containing gas is supplied to the fuel gas supply manifold 42a. In addition, a cooling medium such as pure water, ethylene glycol, or oil is supplied to the pair of cooling medium supply manifolds 44a.

Thus, as illustrated in FIG. 3, the oxidant gas is introduced to the oxidant gas passage 46 of the first separator 30 through the oxidant gas supply manifold 40a. The oxidant gas moves along the oxidant gas passage 46 in the direction of arrow B and is supplied to the cathode electrode 36 of the MEA 28.

On the other hand, the fuel gas is supplied to the fuel gas passage 48 of the second separator 32 through the fuel gas supply manifold 42a. The fuel gas moves along the fuel gas passage 48 in the direction of arrow B in parallel to the flow direction of the oxidant gas and is supplied to the anode electrode 38 of the MEA 28.

Therefore, in the MEA 28, the oxidant gas supplied to the cathode electrode 36 and the fuel gas supplied to anode electrode 38 are consumed by an electrochemical reaction in an electrode catalyst layer to generate electric power.

Subsequently, the oxidant gas, supplied to the cathode electrode 36 of the MEA 28 and consumed is discharged along the oxidant gas discharge manifold 40b in the direction of arrow A. On the other hand, the fuel gas supplied to the anode electrode 38 of the MEA 28 and consumed is discharged along the fuel gas discharge manifold 42b in the direction of arrow A.

Also, the cooling medium supplied to the pair of cooling medium supply manifolds 44a is introduced to the cooling medium passage 50 between the first separator 30 and the second separator 32. The cooling medium flows inwardly once in the direction of arrow C, then moves in the direction of arrow B to cool the MEA 28. The cooling medium moves outwardly in the direction of arrow C, then is discharged along the pair of cooling medium discharge manifolds 44b in the direction of arrow A.

In this case, in the first embodiment, as illustrated in FIG. 4, space S1 is set between the lateral face 65 of the projecting portion 64a included in the first load receiver 60a and the lateral face 78a of the depressed portion 76a included in the first connecting member 24. The space S1 at the root portion 64ab of the projecting portion 64a is set to be smaller in dimension than the space S1 at the end portion 64as of the projecting portion 64a.

Thus, when an external load (impact) is applied to the fuel cell stack 10 (load Fa or load Fb in FIG. 2) and the unit cell 12 is displaced in the direction of arrow B, the first load receiver 60a comes into contact with the first connecting member 24 at the root portion 64ab of the projecting portion 64a (see the contact point P1 in FIG. 4).

Therefore, it is possible to reliably protect the projecting portion 64a from application of a strong stress (moment) thereto. Consequently, the effect is achieved that the possibility of damage of the first load receiver 60a may be reduced as much as possible by a simple configuration.

In addition, the contact point P1 between the engagement portion 74a and the first load receiver 60a is closer to the root portion 64ab than the center h1o at midway of the distance h1 from the root portion 64ab of the first load receiver 60a to the end portion 64as. Therefore, it is possible to more reliably protect the damage of the first load receiver 60a. It is to be noted that the effect similar to that of the above-described first load receiver 60a is obtained by the first load receiver 60b.

Also, in the first embodiment, as illustrated in FIG. 5, the space S2 is set between the lateral face 86 of the depressed portion 68a included in the second load receivers 66a and the lateral face 84 of the projecting portion 82a included in the second connecting member 26. The space S2 on the inner side (near the bottom face 68ae) of the depressed portion 68a in the depth direction is set to be smaller in dimension than the space S2 on the outer side of the depressed portion 68a in the depth direction.

Thus, when an external load (impact) is applied to the fuel cell stack 10 (load Fc or load Fd in FIG. 2) and the unit cell 12 is displaced in the direction of arrow C, the second load receiver 66a comes into contact with the second connecting member 26 on the inner side (near the bottom face 68ae) of the depressed portion 68a in the depth direction (see the contact point P2 in FIG. 5).

Therefore, it is possible to reliably protect the second load receiver 66a from application of a strong stress (moment) thereto. Consequently, the effect is achieved that the possibility of damage of the second load receiver 66a may be reduced as much as possible by a simple configuration.

Furthermore, the contact point P2 between the engagement portion 80a and the second load receiver 66a is closer to the bottom face 68ae than the center h2o at midway of the distance h2 from the outer peripheral edge 56a of the second load receiver 66a to the bottom face 68ae of the depressed portion 68a. Therefore, it is possible to more reliably protect the damage of the second load receiver 66a. It is to be noted that the effect similar to that of the above-described second load receiver 66a is obtained by the second load receiver 66b.

Also, as illustrated in FIG. 2, when the first load receivers 60a, 60b on the longitudinal sides are displaced, the outer peripheral edge 56a and the second connecting member 26 on one of the transverse sides come into surface contact with each other. Similarly, when the second load receivers 66a, 66b on the transverse sides are displaced, the outer peripheral edge 56a and the first connecting member 24 on one of the longitudinal sides come into surface contact with each other. Therefore, part of the load may be held by the surface contact, and it is possible to favorably reduce the load applied to the first load receivers 60a, 60b and the second load receivers 66a, 66b.

Figure 6:
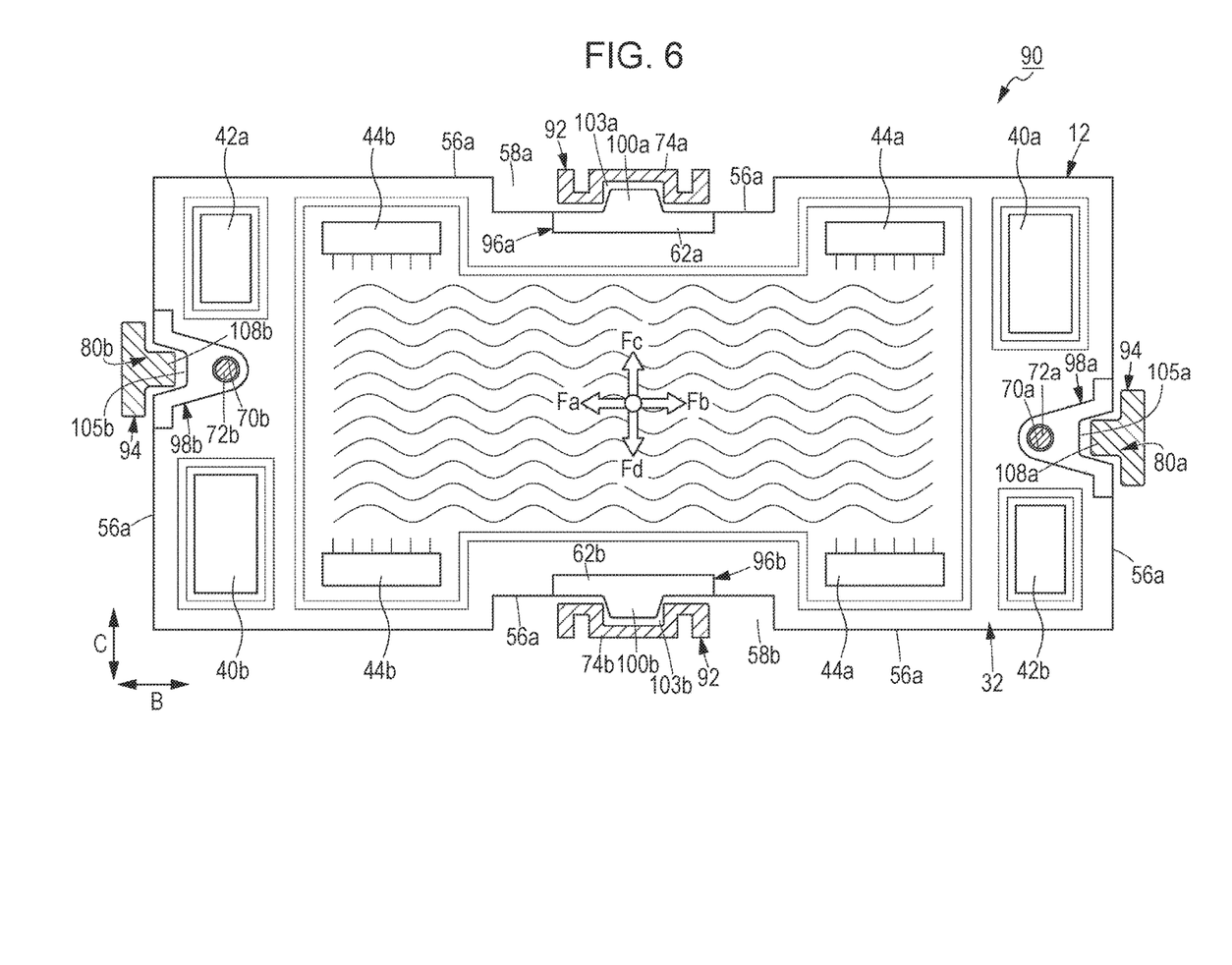
FIG. 6 is a sectional explanatory view of a fuel cell stack according to a second embodiment of the present disclosure.

FIG. 6 is a sectional explanatory view of a fuel cell stack 90 according to a second embodiment of the present disclosure. It is to be noted that the same components as those in the fuel cell stack 10 according to the first embodiment are denoted by the same reference symbols, and detailed description is omitted.

In the fuel cell stack 90, first connecting members 92 are disposed on the longitudinal sides of the unit cells 12 in the stacking direction, and second connecting members 94 are disposed on the transverse sides of the unit cells 12 in the stacking direction. The longitudinal sides of the unit cells 12 are provided with first load receivers 96a, 96b to be engaged with the first connecting members 92, 92, and the transverse sides of the unit cells 12 are provided with second load receivers 98a, 98b to be engaged with the second connecting members 94, 94.

Figure 7:
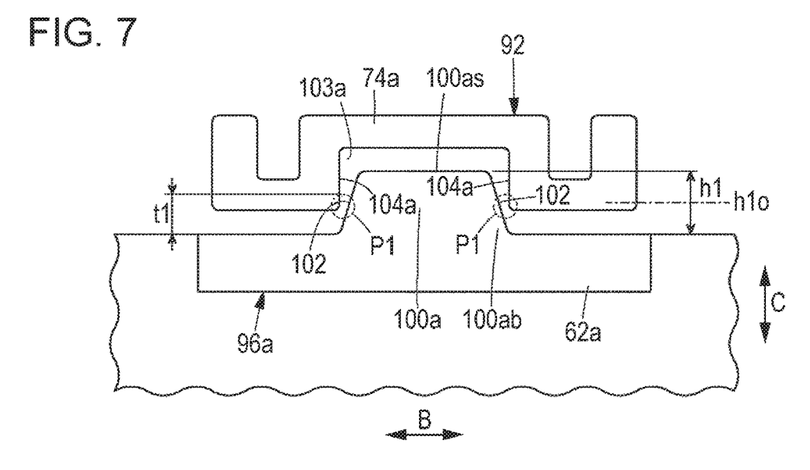
FIG. 7 is an enlarged front view of a principal part illustrating a first connecting member and a first load receiver in a second embodiment.

The first load receivers 96a, 96b are formed of a resin material, for instance, and have projecting portions 100a, 100b that project outwardly from bases 62a, 62b. As illustrated in FIG. 7, both lateral faces 102 of the projecting portion 100a have a tapered shape which is inclined inwardly from root portion 100ab of the projecting portion 100a to end portion 100as. The first connecting members 92 each have depressed portion 103a and a pair of mutually parallel lateral faces 104a of the depressed portion 103a is provided in engagement portion 74a.

When the first load receiver 96a is displaced by an external load, contact point P1 between the engagement portion 74a and the first load receiver 96a is closer to the root portion 100ab than center h1o at midway of distance h1 from the root portion 100ab of the first load receiver 96a to the end portion 100as. More preferably, the contact point P1 is located within the range of control dimension for damage prevention t1 of the first load receiver 96a. It is to be noted that the first load receiver 96b is formed similarly to the above-described first load receiver 96a.

Figure 8:
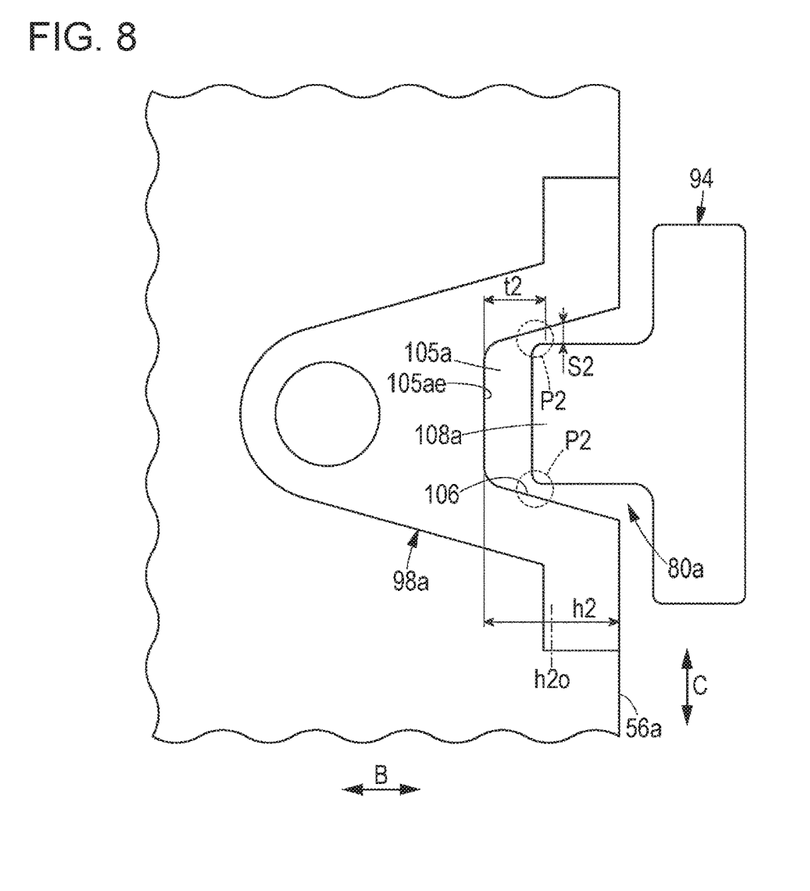
FIG. 8 is an enlarged front view of a principal part illustrating a second connecting member and a second load receiver in the second embodiment.

As illustrated in FIG. 6, the second load receivers 98a, 98b are formed of a resin material, for instance, and have depressed portions 105a, 105b that are internally depressed from the outer peripheral edge 56a. As illustrated in FIG. 8, the lateral face 106 of the depressed portion 105a has a tapered shape which is inclined outwardly from the inner side (near the bottom face 105ae) of the depressed portion 105a in the depth direction to the outer side in the depth direction. The second connecting members 94 is provided with projecting portions 108a, 108b to be inserted in depressed portions 105a, 105b. The projecting portions 108a, 108b have a rectangular shape (a pair of lateral faces are parallel to each other).

As illustrated in FIG. 8, when the second load receivers 98a is displaced by an external load, contact point P2 between the engagement portion 80a and the second load receiver 98a is located nearer to the bottom face 105ae than center h2o at midway of distance h2 from the outer peripheral edge 56a to the bottom face 105ae of the depressed portion 105a. More preferably, the contact point P2 is located within the range of control dimension for damage prevention t2 of the second load receiver 98a. It is to be noted that the second load receiver 98b is formed similarly to the above-described second load receiver 98a.

In the second embodiment configured in this manner, the same effect as that in the first embodiment is obtained, that is, the possibility of damage of the first load receivers 96a, 96b and the second load receivers 98a, 98b may be reduced as much as possible by a simple configuration.

Figure 9:
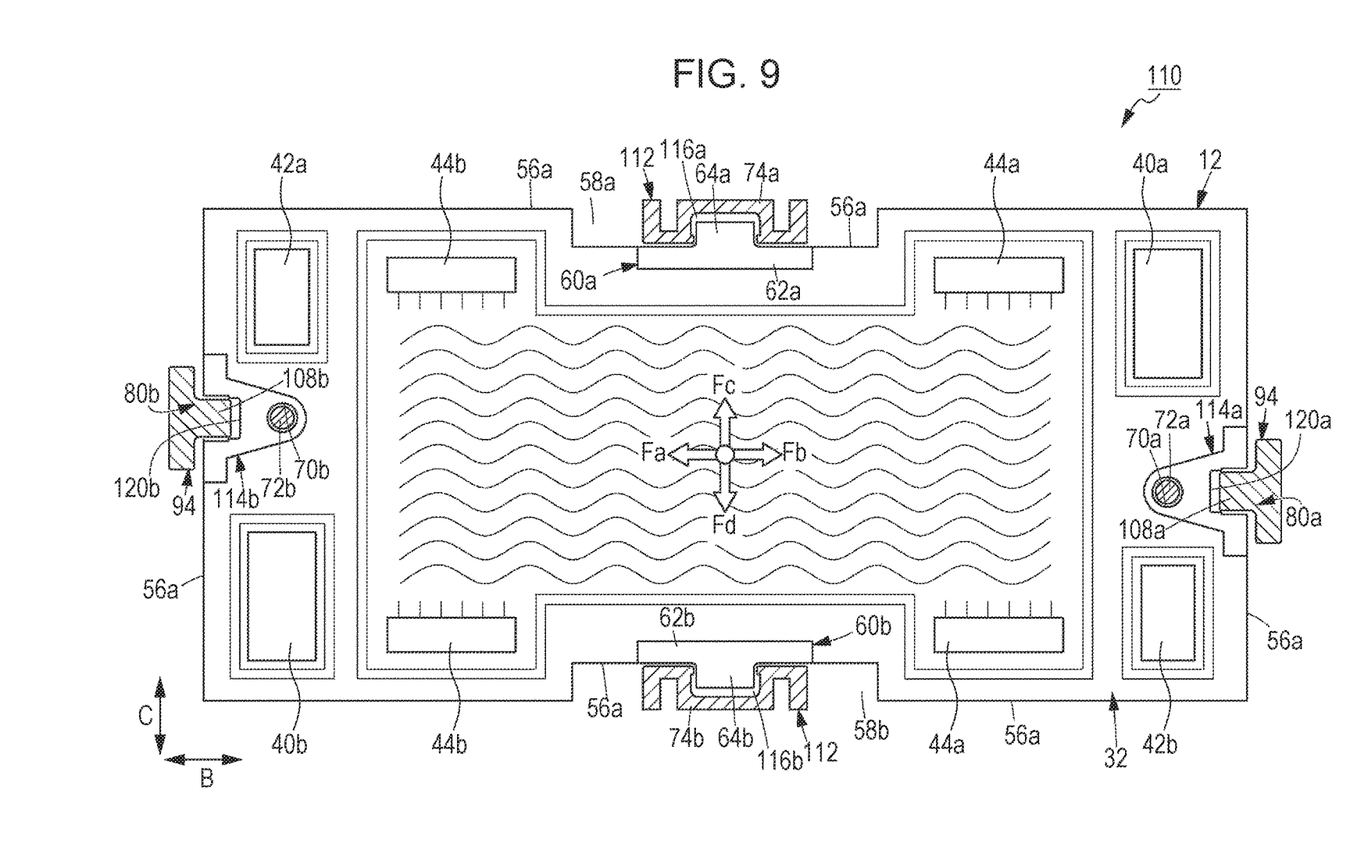
FIG. 9 is a sectional explanatory view of a fuel cell stack according to a third embodiment of the present disclosure.

FIG. 9 is a sectional explanatory view of a fuel cell stack 110 according to a third embodiment of the present disclosure. It is to be noted that the same components as those in the fuel cell stack 10 according to the first embodiment and the fuel cell stack 90 according to the second embodiment are denoted by the same reference symbols, and detailed description is omitted.

In the fuel cell stack 110, first connecting members 112 are disposed on the longitudinal sides of the unit cells 12 in the stacking direction, and second connecting members 94 are disposed on the transverse sides of the unit cells 12 in the stacking direction. The longitudinal sides of the unit cells 12 are provided with the first load receivers 60a, 60b to be engaged with the first connecting members 112, 112, and the transverse sides of the unit cells 12 are provided with second load receivers 114a, 114b to be engaged with the second connecting members 94, 94.

Figure 10:
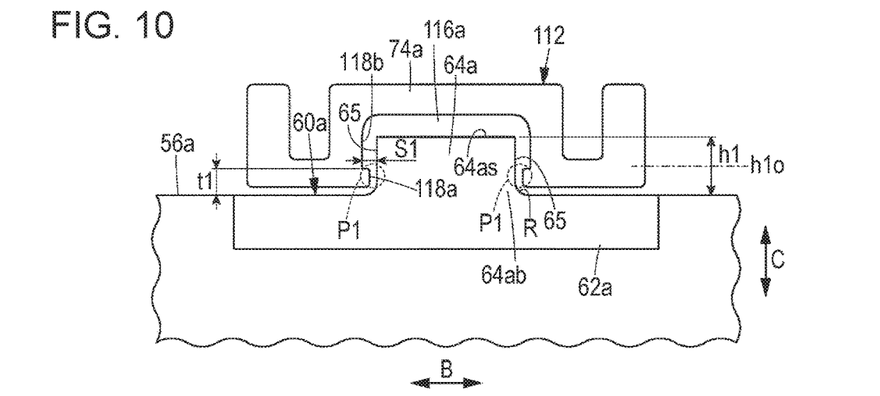
FIG. 10 is an enlarged front view of a principal part illustrating a first connecting member and a first load receiver in the third embodiment.

As illustrated in FIG. 10, the first connecting members 112 each have depressed portion 116a in which the projecting portion 64a is inserted, and the depressed portion 116a includes first lateral face 118a and second lateral face 118b. The first lateral face 118a is provided in an open lateral end of the depressed portion 116a, and the second lateral face 118b having a large width is connected to the inner end of the first lateral face 118a through a level difference. The first lateral face 118a is located nearer to the root portion 64ab than center h1o at midway of distance h1, more preferably, the contact point P1 is located within the range of control dimension for damage prevention t1 of the first load receiver 60a.

Figure 11:
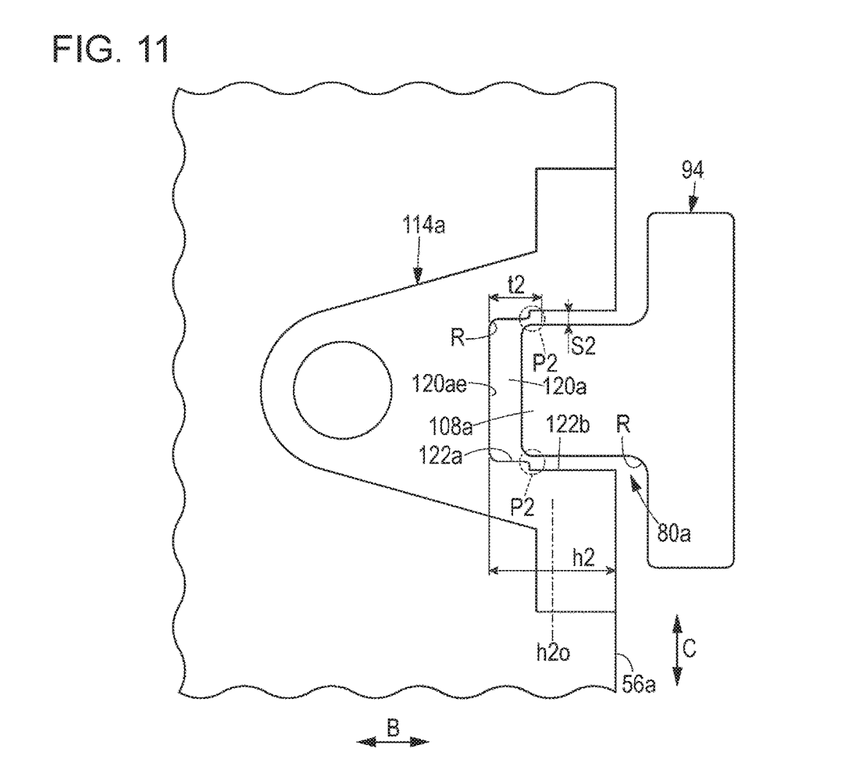
FIG. 11 is an enlarged front view of a principal part illustrating a second connecting member and a second load receiver in the third embodiment.

As illustrated in FIG. 9, the second load receivers 114a, 114b are formed of a resin material, for instance, and have depressed portions 120a, 120b that are internally depressed from the outer peripheral edge 56a. As illustrated in FIG. 11, the depressed portion 120a includes first lateral face 122a and second lateral face 122b.

The first lateral face 122a is provided in the inner side of the depressed portion 120a in the depth direction, that is, provided in a predetermined range from bottom face 120ae to the outer side in the depth direction. The second lateral face 122b having a large width is connected to the end of the first lateral face 122a through a level difference. The first lateral face 122a is located nearer to the bottom face 120ae than center h2o at midway of distance h2, more preferably, the contact point P2 is located within the range of control dimension for damage prevention t2 of the second load receiver 114a. It is to be noted that the second load receiver 114b is formed similarly to the above-described second load receiver 114a.

In the third embodiment configured in this manner, the same effect as that in the first and second embodiments is obtained, that is, the possibility of damage of the first load receivers 60*a*, 60*b* and the second load receivers 114*a*, 114*b* may be reduced as much as possible by a simple configuration.

The present disclosure relates to a fuel cell stack in which a plurality of unit cells is stacked, each of which being formed by sandwiching a membrane electrode assembly between a pair of separators, the membrane electrode assembly including an electrolyte interposed between an anode electrode and a cathode electrode.

There is provided a resin load receiver in the separators to receive a load in a direction perpendicular to a stacking direction of the unit cells. Also, there is provided a connecting member that extends in the stacking direction of the unit cells and supports the unit cells, the connecting member including an engagement portion to be engaged with the load receiver.

The load receiver has a projecting portion that projects outwardly from an outer peripheral edge of the separators, and the engagement portion has a depressed portion in which the projecting portion is inserted. The space between a lateral face of the projecting portion and a lateral face included in the depressed portion is set to be smaller in dimension at a root portion of the projecting portion than at an end of the projecting portion. Thus, when an external load (impact) is applied to the fuel cell stack and a unit cell is displaced, the load receiver is in contact with the connecting member at the root of the projecting portion. Therefore, it is possible to reliably protect the projecting portion from application of a strong stress (moment) thereto. Consequently, the possibility of damage of the load receiver may be reduced as much as possible by a simple configuration.

In addition, it is preferable that the lateral face of the projecting portion have a tapered shape which is inclined inwardly from the root portion of the projecting portion toward the end of the projecting portion, or the lateral face included in the depressed portion have a tapered shape which is inclined outwardly from the root portion of the projecting portion toward the end of the projecting portion.

It is preferable that when the load receiver is displaced by an external load, a contact point between the engagement portion and the load receiver be closer to the outer peripheral edge than a center at midway of a distance from the outer peripheral edge of the load receiver to the end of the load receiver.

Furthermore, in the present disclosure, the load receiver has a depressed portion that is internally depressed from the outer peripheral edge of the separators, the engagement portion has a projecting portion to be inserted in the depressed portion, and a space between a lateral face included in the depressed portion and a lateral face of the projecting portion is set to be smaller in dimension on an inner side of the depressed portion in a depth direction than on an outer side of the depressed portion in the depth direction. Thus, when an external load (impact) is applied to the fuel cell stack and a unit cell is displaced, the load receiver is in contact with the connecting member on the inner side (near the bottom face) of the depressed portion in the depth direction. Therefore, it is possible to reliably protect the load receiver from application of a strong stress (moment) thereto. Consequently, the possibility of damage of the load receiver may be reduced as much as possible by a simple configuration.

It is preferable that the lateral face included in the depressed portion have a tapered shape which is inclined outwardly from the inner side of the depressed portion in the depth direction toward the outer side of the depressed portion in the depth direction, or it is preferable that the lateral face of the projecting portion have a tapered shape which is inclined inwardly from the inner side of the depressed portion in the depth direction toward the outer side of the depressed portion in the depth direction.

It is preferable that when the load receiver is displaced by an external load, a contact point between the engagement portion and the load receiver be closer to a bottom face of the depressed portion than a center at midway of a distance from the outer peripheral edge of the load receiver to the bottom face.

It is preferable that the unit cells each have a rectangular shape, each side of the rectangular shape be provided with the load receiver, and when the load receiver provided on one of a longer side and a shorter side is displaced, the outer peripheral edge and the connecting member on the other side come into surface contact with each other.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell stack comprising:
   a plurality of unit cells that is stacked, each of the unit cells being formed by sandwiching a membrane electrode assembly between a pair of separators, the membrane electrode assembly being formed by interposing an electrolyte between an anode electrode and a cathode electrode;
   a resin load receiver that is provided in the separators and that receives a load in a direction perpendicular to a stacking direction of the unit cells; and
   a connecting member that extends in the stacking direction of the unit cells and supports the unit cells, the connecting member including an engagement portion to be engaged with the load receiver,
   wherein the load receiver has a projecting portion that projects outwardly from an outer peripheral edge of the separators,
   the engagement portion has a depressed portion in which the projecting portion is inserted, and
   a space between a lateral face of the projecting portion and a lateral face included in the depressed portion is set to be smaller in dimension at a root portion of the projecting portion than at an end of the projecting portion.

2. The fuel cell stack according to claim 1,
   wherein the lateral face of the projecting portion has a tapered shape which is inclined inwardly from the root portion of the projecting portion toward the end of the projecting portion, or
   the lateral face included in the depressed portion has a tapered shape which is inclined outwardly from the root portion of the projecting portion toward the end of the projecting portion.

3. The fuel cell stack according to claim 1,
   wherein when the load receiver is displaced by an external load, a contact point between the engagement portion and the load receiver is closer to the outer peripheral edge than a center at midway of a distance from the outer peripheral edge of the load receiver to the end of the load receiver.

4. A fuel cell stack comprising:
   a plurality of unit cells that is stacked, each of the unit cells being formed by sandwiching a membrane electrode assembly between a pair of separators, the membrane electrode assembly being formed by interposing an electrolyte between an anode electrode and a cathode electrode;
a resin load receiver that is provided in the separators and that receives a load in a direction perpendicular to a stacking direction of the unit cells; and
a connecting member that extends in the stacking direction of the unit cells and supports the unit cells, the connecting member including an engagement portion to be engaged with the load receiver,
wherein the load receiver has a depressed portion that is internally depressed from the outer peripheral edge of the separators,
the engagement portion has a projecting portion to be inserted in the depressed portion, and
a space between a lateral face included in the depressed portion and a lateral face of the projecting portion is set to be smaller in dimension on an inner side of the depressed portion in a depth direction than on an outer side of the depressed portion in the depth direction.

5. The fuel cell stack according to claim 4,
wherein the lateral face included in the depressed portion has a tapered shape which is inclined outwardly from the inner side of the depressed portion in the depth direction toward the outer side of the depressed portion in the depth direction, or
the lateral face of the projecting portion has a tapered shape which is inclined inwardly from the inner side of the depressed portion in the depth direction toward the outer side of the depressed portion in the depth direction.

6. The fuel cell stack according to claim 4,
wherein when the load receiver is displaced by an external load, a contact point between the engagement portion and the load receiver is closer to a bottom face of the depressed portion than a center at midway of a distance from the outer peripheral edge of the load receiver to the bottom face.

7. The fuel cell stack according to claim 1,
wherein the unit cells each have a rectangular shape, each side of the rectangular shape is provided with the load receiver, and
when the load receiver provided on one of a longer side and a shorter side is displaced, the outer peripheral edge and the connecting member on the other side come into surface contact with each other.

8. A fuel cell stack comprising:
unit cells stacked in a stacking direction, each of the unit cells comprising:
  a membrane electrode assembly comprising:
    an electrolyte;
    an anode electrode; and
    a cathode electrode, the electrolyte being interposed between the anode electrode and the cathode electrode in the stacking direction;
  a first separator; and
  a second separator, the membrane electrode assembly being sandwiched between the first separator and the second separator in the stacking direction;
a resin load receiver provided in each of the first and second separators so as to receive a load in a direction perpendicular to the stacking direction, the resin load receiver having a projecting portion that projects outwardly from an outer peripheral edge of each of the first and second separators and that has a projecting portion lateral face; and
a connecting member supporting the unit cells and including an engagement portion engaged with the resin load receiver and having a depressed portion into which the projecting portion is inserted and which has a depressed portion lateral face facing the projecting portion lateral face, a distance between the projecting portion lateral face and the depressed portion lateral face at a root portion of the projecting portion being smaller than a distance between the projecting portion lateral face and the depressed portion lateral face at an end of the projecting portion.

9. The fuel cell stack according to claim 8,
wherein the projecting portion lateral face has a tapered shape which is inclined inwardly from the root portion of the projecting portion toward the end of the projecting portion, or
the depressed portion lateral face has a tapered shape which is inclined outwardly from the root portion of the projecting portion toward the end of the projecting portion.

10. The fuel cell stack according to claim 8,
wherein when the resin load receiver is displaced by an external load, a contact point at which the engagement portion and the resin load receiver are to contact each other is closer to the outer peripheral edge than a center at midway of a distance from the outer peripheral edge to the end of the projecting portion.

11. The fuel cell stack according to claim 8,
wherein the unit cells each have a rectangular shape, each side of the rectangular shape is provided with the resin load receiver, and
when the resin load receiver provided on one of a longer side and a shorter side is displaced, the outer peripheral edge and the connecting member on another side come into surface contact with each other.

12. The fuel cell stack according to claim 8,
wherein a first R-shaped portion which is to be in point contact with the resin load receiver is provided at an open lateral end of the depressed portion lateral face, and
wherein a second R-shaped portion is provided at the root portion of the projecting portion.

13. The fuel cell stack according to claim 1,
wherein the load receiver includes a base that is provided in the separators, the projecting portion projects outwardly from the base, the base and the projecting portion being integrally formed as a single piece.

14. The fuel cell stack according to claim 1,
wherein the depressed portion has a U-shaped configuration, the projecting portion extending within the U-shaped configuration.

15. The fuel cell stack according to claim 1,
wherein the connecting member directly contacts and is secured to both a first end plate and a second end plate, the first end plate being provided on a first end of the plurality of unit cells and the second end plate being provided on a second end of the plurality of unit cells.

16. The fuel cell stack according to claim 4,
wherein the depressed portion has a U-shaped configuration that is internally depressed from the outer peripheral edge of the separators, the projecting portion extending within the U-shaped configuration.

17. The fuel cell stack according to claim 4,
wherein the connecting member directly contacts and is secured to both a first end plate and a second end plate, the first end plate being provided on a first end of the plurality of unit cells and the second end plate being provided on a second end of the plurality of unit cells.

18. The fuel cell stack according to claim 8, wherein the resin load receiver includes a base that is provided in the first and second separators, the projecting portion projects outwardly from the base, the base and the projecting portion being integrally formed as a single piece.

19. The fuel cell stack according to claim 8, wherein the depressed portion has a U-shaped configuration, the projecting portion extending within the U-shaped configuration.

20. The fuel cell stack according to claim 8, wherein the connecting member directly contacts and is secured to both a first end plate and a second end plate, the first end plate being provided on a first end of the plurality of unit cells and the second end plate being provided on a second end of the plurality of unit cells.

* * * * *